United States Patent
Yoshimoto et al.

(10) Patent No.: US 6,360,058 B1
(45) Date of Patent: Mar. 19, 2002

(54) DATA RECORDING APPARATUS, DATA REPRODUCTION APPARATUS, DATA RECORDING AND/OR REPRODUCING APPARATUS, DATA RECORDING METHOD, AND DATA RECORDING AND/OR REPRODUCING METHOD

(75) Inventors: Masakazu Yoshimoto; Satoshi Yoneya, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/107,217

(22) Filed: Jun. 29, 1998

(30) Foreign Application Priority Data

Jun. 30, 1997 (JP) ............................................. 9-174809

(51) Int. Cl.[7] .......................... H04N 5/781; H04N 5/94
(52) U.S. Cl. ...................................... 386/116; 386/125
(58) Field of Search .............................. 386/46, 98, 112, 386/116, 124, 125, 126, 113; 714/5; H04N 5/781, 5/94

(56) References Cited

U.S. PATENT DOCUMENTS

| | | | |
|---|---|---|---|
| 4,647,986 A | * | 3/1987 | Vaughn et al. ............... 386/125 |
| 5,233,618 A | * | 8/1993 | Glider et al. ................... 714/6 |
| 5,416,600 A | * | 5/1995 | Matsumi et al. ............. 386/116 |
| 5,719,985 A | * | 2/1998 | Ito et al. ...................... 386/109 |
| 5,754,730 A | * | 5/1998 | Windrem et al. ............ 386/125 |
| 5,809,206 A | * | 9/1998 | Seki ............................. 386/125 |
| 5,815,636 A | * | 9/1998 | Fujii et al. ................... 386/116 |
| 5,905,847 A | * | 5/1999 | Kobayashi et al. .......... 386/125 |
| 5,923,817 A | * | 7/1999 | Nakamura ................... 386/125 |

* cited by examiner

*Primary Examiner*—Huy Nguyen
(74) *Attorney, Agent, or Firm*—Frommer Lawrence & Haug LLP; William S. Frommer; Darren M. Simon

(57) ABSTRACT

A video signal recording and/or reproducing apparatus records a digital video signal of baseband into multiple RAIDs distributively. If one RAID fails to read out data of a pixel, it is substituted by data "00". The video signals from all RAIDs are formed into a serial video signal. If the data "00" is detected in the serial video signal, it is given a proper value based on the interpolation process using data of the neighboring pixels, so that a high-fidelity picture is reproduced continuously from the video signal.

6 Claims, 6 Drawing Sheets

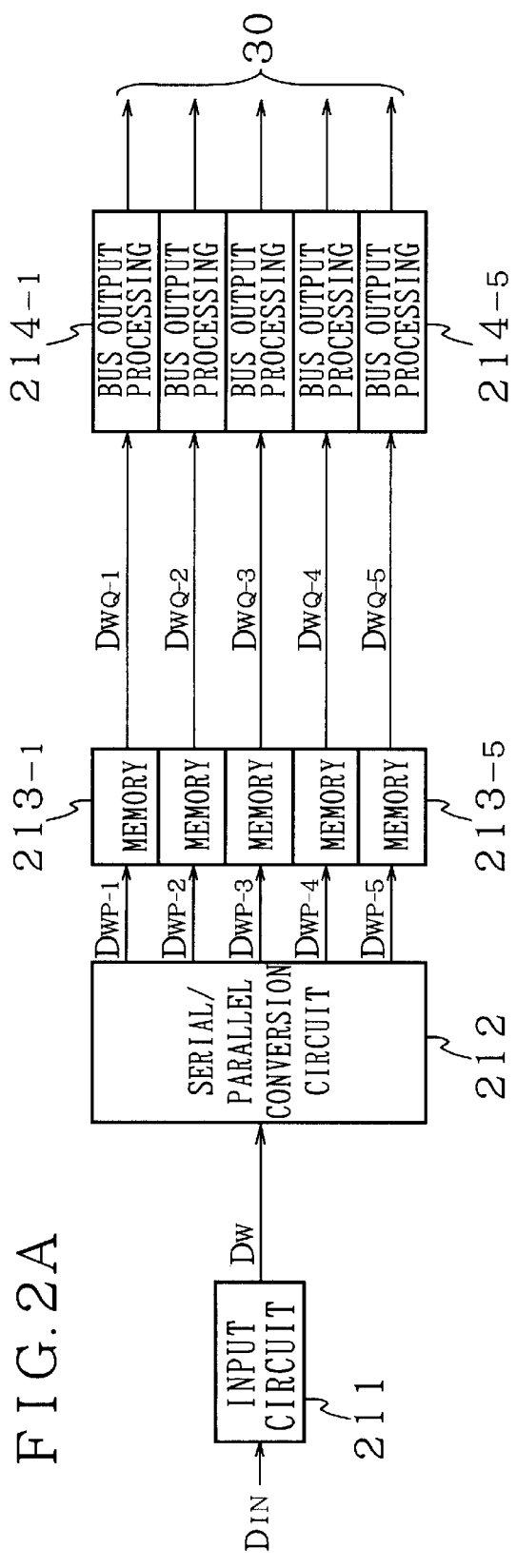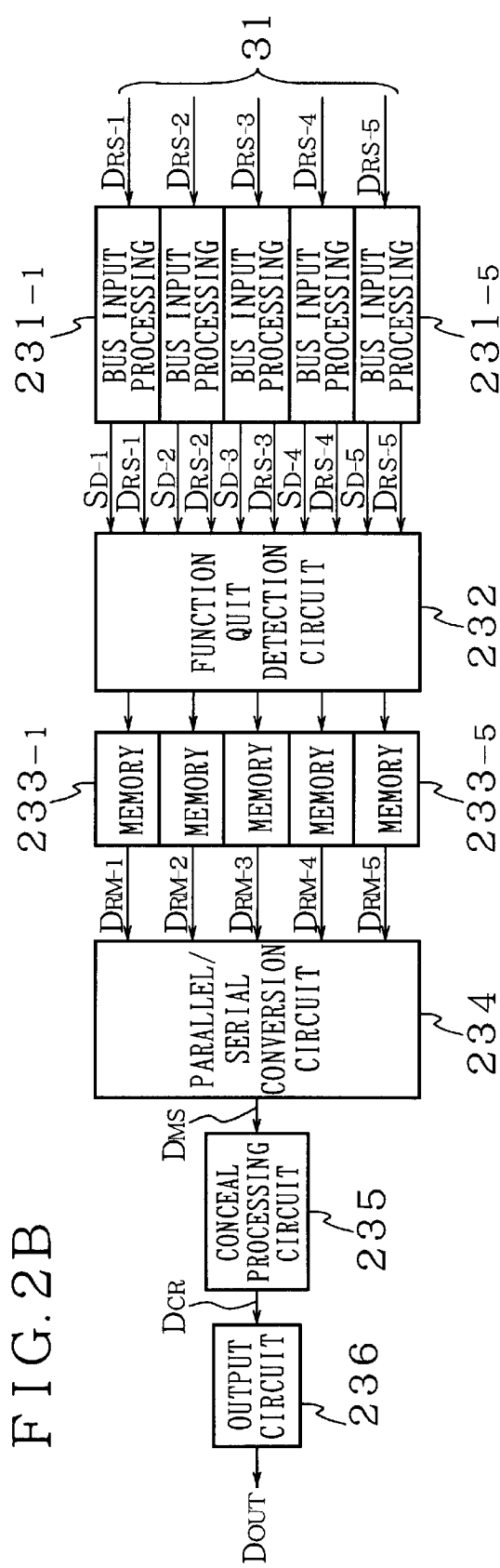

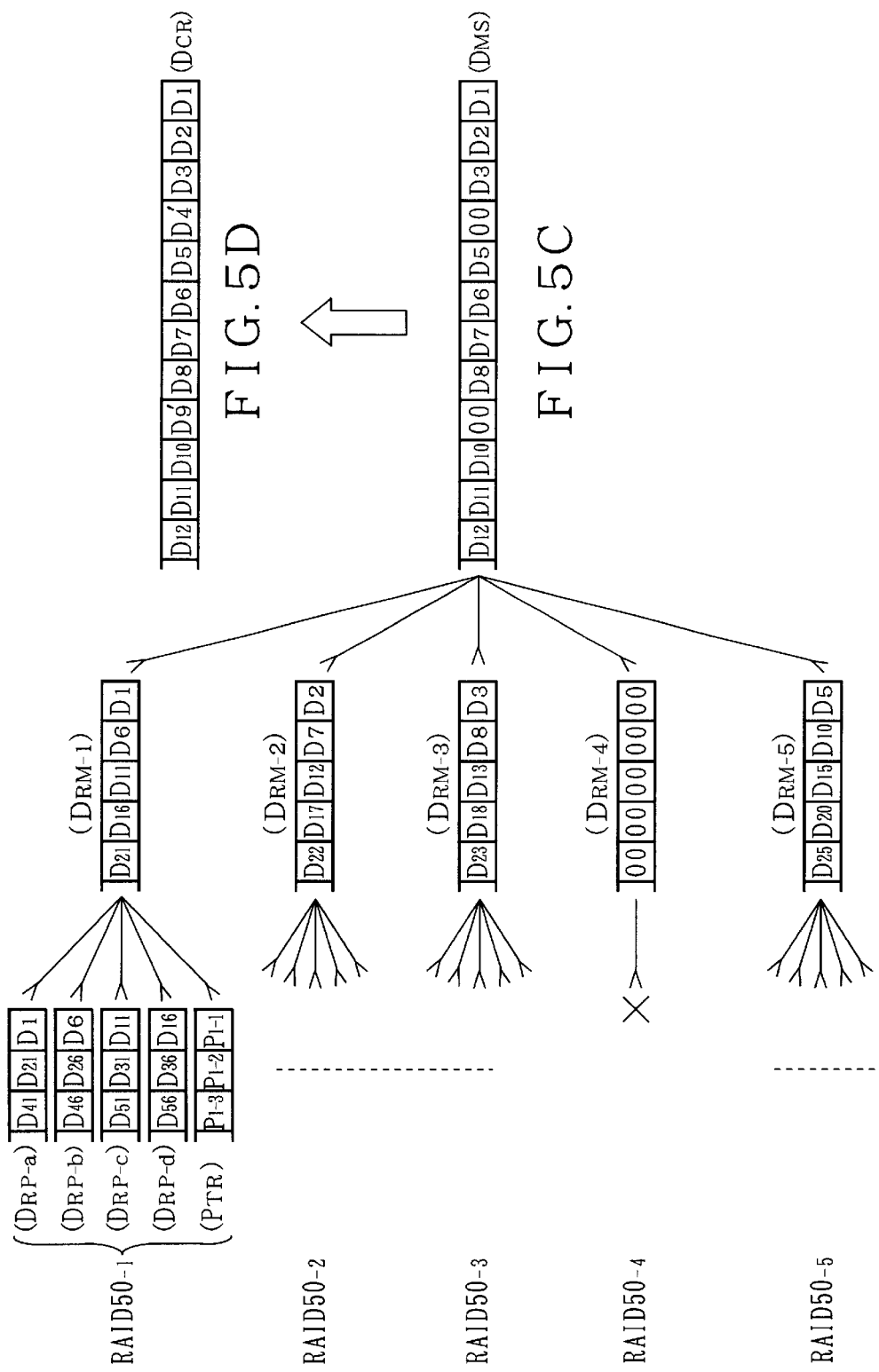

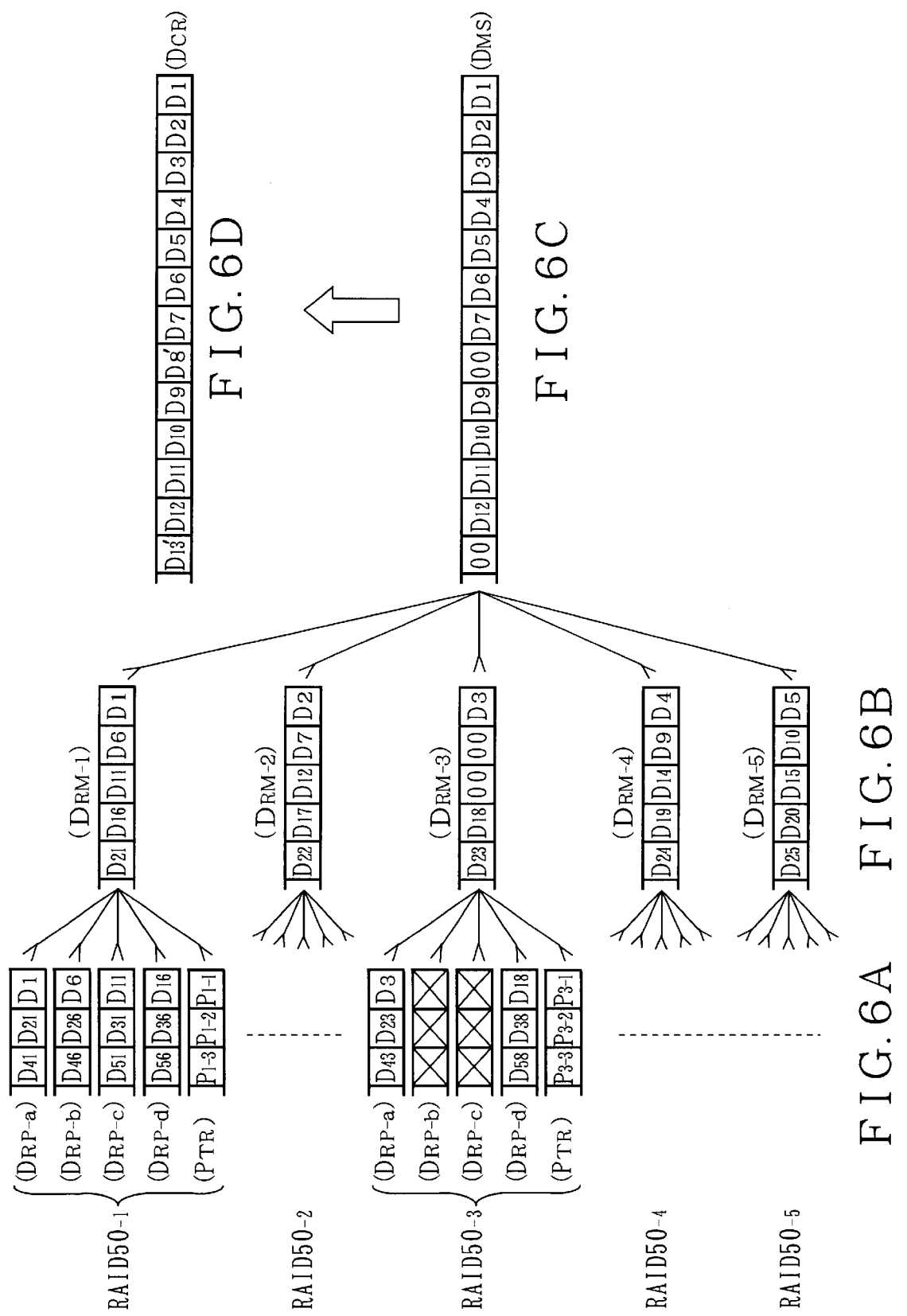

DATA RECORDING APPARATUS, DATA REPRODUCTION APPARATUS, DATA RECORDING AND/OR REPRODUCING APPARATUS, DATA RECORDING METHOD, AND DATA RECORDING AND/OR REPRODUCING METHOD

BACKGROUND OF THE INVENTION

1. Field of the Invention

The present invention relates to a video signal recording and/or reproducing method and video signal recording and/or reproducing apparatus. More particularly, the invention relates to a video signal recording and/or reproducing method and video signal recording and/or reproducing apparatus for recording a digital video signal of baseband on a disk unit including multiple disk recording mediums and reading the recorded video signal out of the disk recording mediums, wherein in case a pixel cannot be read out as a video signal, the video signal for the pixel is produced based on the interpolation process using video signals of the neighboring pixels so that a high-fidelity picture is reproduced continuously.

2. Description of the Prior Art

With the recent prevalence of multi-channel information providing services including the CATV (cable television), there is a growing demand for recording or reproducing multiple video/audio data simultaneously or recording one video/audio data while reproducing another video/audio data with one video/audio data recording and/or reproducing apparatus, which is different from the usage of the conventional VTR (video tape recorder). In order to meet this demand, an apparatus called video server (or AV (audio and/or video) server) which records and reproduces video/audio signals on a random-access recording medium such as a hard disk is going to prevail.

In general, the video server used in broadcast stations needs to have a high data transfer rate to meet the demand of high image and sound quality and a large recording capacity for long-time data recording. On this account, there is an attempt of raising the data transfer rate and increasing the recording capacity by employment of a data recording and/or reproducing apparatus including multiple hard disks (will be termed "HDs") which can store video/audio data and process the data in parallel, and another attempt of enhancing the reliability of HDs against the failure of HD based on the recording of parity data. With these schemes put into practice, it becomes possible to accomplish a versatile multi-channel video server which reproduces multi-channel data simultaneously based on the discrete recording of source video/audio data, or build a VOD (video on-demand) or NVOD (near video on-demand) system based on the multi-channel, time-shift reproduction of one source data, even in case the number of channels required varies depending on the program or the mode of broadcasting.

The data recording and/or reproducing apparatus used for the above-mentioned video server is based on the RAID (Redundant Arrays of Inexpensive Disks) technique which uses hard disk drive units (will be termed "HDDs") including multiple HDs, as proposed by Patterson, et al. in 1988 in the article entitled "A Case for Redundant Arrays of Inexpensive Disks (RAID)" in the publication of ACM SIGMOND Conference, Chicago, Ill., Jun. 1–3, 1988.

The RAID described in the above-mentioned article falls into RAID-1 through RAID-5. The RAID-1 is a scheme of writing the same content onto two HDDs. The RAID-3 is a scheme of dividing input data into pieces of data of a certain length and recording the data onto multiple HDDs, and producing parity data which is the exclusive logical sum of corresponding data blocks of the HDDs and recording the parity data onto another HDD. The RAID-5 is a scheme of recording one large divided data block onto one HDD and recording a block of parity data which is the exclusive logical sum of corresponding data blocks of the HDDs distributively onto other HDDs.

However, even the data recording and/or reproducing apparatus arranged as described above cannot correct the reproduced data if two or more of the HDDs which form the RAIDs fail to read out data simultaneously or if the RAIDs in parallel operation quit the data readout function.

The probability of the occurrence of simultaneous read error of two or more RAIDs is extremely low theoretically, and it is conceived to impose no problem so far as the above-mentioned video server which records and reproduces data by means of multiple RAIDs is kept used in broadcast stations or the like.

Practically, however, quitting of function of RAIDs due to a defect in the RAID control program or the simultaneous failure of two or more HDDs due to the disparity of products at the early stage of HDD manufacturing can possibly occur at a frequency beyond the theoretical rate.

The failure of normal readout of video and audio data from the RAIDs will compel the broadcast station to suspend the broadcasting or editing of a program in the course of broadcasting for example.

SUMMARY OF THE INVENTION

Accordingly, it is an object of the present invention to provide a data recording apparatus, data reproduction apparatus, data recording and/or reproducing apparatus, a data recording method, data reproduction method, and data recording and/or reproducing method capable of reproducing high-fidelity data continuously from nonlinear-access recording mediums even in case data cannot be read out partially.

A data recording apparatus according to a first aspect of this invention for recording data including video data onto a plurality of nonlinear-access recording mediums comprises: a plurality of input and/or output processing means which operate in the time slots assigned thereto to release data, which has been supplied from the outside, to the recording mediums so that the data is recorded onto the recording mediums, and operate in the assigned time slots to process the data recorded on the recording mediums and release the data to the outside; and recording control means which controls the data of individual pixels released by the input and/or output processing means such that data of neighboring pixels are recorded onto different ones of the recording mediums.

A data recording apparatus according to a second aspect of this invention for recording data including video data onto a plurality of nonlinear-access recording mediums comprises: a plurality of data input processors which operate in the time slots assigned thereto to release data, which has been supplied from the outside, to the recording mediums so that the data is recorded onto the recording mediums; and recording means which records the data released by the data input processors onto the recording mediums, with the data input processors each including first serial-to-parallel conversion means which converts the input pixel data into parallel pixel data, and with the recording means including second serial-to-parallel conversion means which converts the parallel pixel data released by the data input processor into parallel pixel data.

A data reproduction apparatus according to a third aspect of this invention for reproducing data including video data which is recorded on a plurality of nonlinear-access recording mediums such that data of neighboring image pixels are recorded on different recording mediums comprises: a plurality of output processing means which operate in the time slots assigned thereto to release data including video data recorded on the recording mediums to the outside, with the output processing means including error correction processing means which implements the error correction based on an interpolation process using data of the neighboring pixels among the data reproduced from the recording mediums.

A data reproduction apparatus according to a fourth aspect of this invention for reproducing data including video data which is recorded on a plurality of nonlinear-access recording mediums such that data of neighboring image pixels are recorded on different recording mediums comprises: a plurality of reproduction means which reproduce the data recorded on the recording mediums; and a plurality of output processing means which operate in the time slots assigned thereto to process the data released by the reproduction means and release the processed data to the outside, with the reproduction means each including first parallel-to-serial conversion means which converts the data released from the recording mediums into serial data, and with the output processing means each including second parallel-to-serial conversion means which converts the serial pixel data released by the reproduction means into serial pixel data and error correction processing means which implements the error correction based on an interpolation process using data of the neighboring pixels among the data released by the second parallel-to-serial conversion means.

A data reproduction apparatus according to a fifth aspect of this invention for reproducing data including video data which is recorded on a plurality of nonlinear-access recording mediums such that data of neighboring image pixels are recorded on different recording mediums comprises: a plurality of output processing means which operate in the time slots assigned thereto to release the data reproduced from the recording mediums to the outside, with the output processing means each including function quit detection means which receives a detection signal indicative of whether or not data is released from the nonlinear-access recording mediums and responds to the detection signal, which indicates that the data is not released, to release specific error detection data in substitution for the data from the recording mediums and error correction processing means which implements the error correction process for the error detection data released by the function quit detection means based on an interpolation process using reproduced data of the neighboring pixels.

A data reproduction apparatus according to a sixth aspect of this invention for reproducing data including video data which is recorded on a plurality of nonlinear-access recording mediums such that data of neighboring image pixels are recorded on different recording mediums comprises: a plurality of reproduction means which reproduce the recorded data; and a plurality of output processing means which operate in the time slots assigned thereto to release the data reproduced from the recording mediums to the outside, with the reproduction means each including error detection means which receives and responds to the error detection signal, which indicates that data cannot be read out of the nonlinear-access recording mediums, to release error detection data in substitution for the data from the recording mediums, and with the output processing means each including error correction processing means which implements the error correction process for the error detection data released by the reproduction means based on an interpolation process using data of the neighboring pixels released by the reproduction means.

A data reproduction apparatus according to a seventh aspect of this invention for reproducing data including video data which is recorded on a plurality of nonlinear-access recording mediums such that data of neighboring image pixels are recorded on different recording mediums comprises: reproduction means which reproduces the recorded data; and output processing means which operates in the time slot assigned thereto to release the data released by the reproduction means to the outside, with the reproduction means including parity calculation means which receives the data read out of the recording mediums and responds to the occurrence of readout error of the data to implement the parity calculation for the data read out of the other recording mediums by using the parity data and detect the error of the parity data and parity error detection means which receives the readout data and receives and responds to the parity error detection signal from the parity calculation means to release specific error detection data in substitution for all of the readout data, and with the output processing means including error correction processing means which implements the error correction process for the error detection data released by the reproduction means using data of the neighboring pixels released by the reproduction means.

A data recording and/or reproducing apparatus according to an eighth aspect of this invention for recording data including video data onto a plurality of nonlinear-access recording mediums and reproducing the recorded data is the combination of the data recording apparatus of the first aspect and the data reproduction apparatus of the third aspect.

A data recording and/or reproducing apparatus according to a ninth aspect of this invention for recording data including video data onto a plurality of nonlinear-access recording mediums and reproducing the recorded data is the combination of the data recording apparatus of the first aspect and the data reproduction apparatus of the fifth aspect.

A data recording and/or reproducing apparatus according to a tenth aspect of this invention for recording data including video data onto a plurality of nonlinear-access recording mediums and reproducing the recorded data is the combination of the data recording apparatus of the first aspect and the data reproduction apparatus of the sixth aspect.

A data recording and/or reproducing apparatus according to a eleventh aspect of this invention for recording data including video data onto a plurality of nonlinear-access recording mediums and reproducing the recorded data is the combination of the data recording apparatus of the first aspect and the data reproduction apparatus of the seventh aspect.

A data recording and/or reproducing apparatus according to a twelfth aspect of this invention for recording data including video data onto a plurality of nonlinear-access recording mediums and reproducing the recorded data is the combination of the data recording apparatus of the second aspect and the data reproduction apparatus of the fourth aspect.

A data recording method according to the first aspect of this invention for recording data including video data onto a plurality of nonlinear-access recording mediums comprises: a first step of operating in the assigned time slot to release data which has been supplied from the outside so that the data is recorded onto the recording mediums; and a second step of controlling the data of individual image pixels released in the first step such that data of neighboring pixels are recorded onto different ones of the recording mediums.

A data recording method according to the second aspect of this invention for recording data including video data onto a plurality of nonlinear-access recording mediums comprises: a first step of operating in the assigned time slots to release data, which has been supplied from the outside, to the recording mediums so that the data is recorded onto the recording mediums; and a second step of recording the data released in the first step onto the recording mediums, with the first step including a first serial-to-parallel conversion step of converting the input pixel data into parallel data, and with the second step including a second serial-to-parallel conversion step of converting the parallel pixel data released in the first conversion step into parallel data.

A data reproduction method according to the third aspect of this invention for reproducing data including video data which is recorded on a plurality of nonlinear-access recording mediums comprises: an output processing step of operating in the assigned time slot to release data including video data recorded on the recording mediums to the outside, with the output processing step including an error correction processing step of implementing the error correction based on an interpolation process using data of the neighboring pixels among the data reproduced from the recording mediums.

A data reproduction method according to the fourth aspect of this invention for reproducing data including video data which is recorded on a plurality of nonlinear-access recording mediums such that data of neighboring image pixels are recorded on different recording mediums comprises: a first step of reproducing the data recorded on the recording mediums; and a second step of operating in the assigned time slot to process the data reproduced in the first step and release the processed data to the outside, with the first step including a first parallel-to-serial conversion step of converting the data released from the recording mediums into serial data, and with the second step including a second parallel-to-serial conversion step of converting the serial data released in the first conversion step into serial data and an error correction step of implementing the error correction based on an interpolation process using data of the neighboring pixels among the data released in the second conversion step.

A data reproduction method according to the fifth aspect of this invention for reproducing data including video data which is recorded on a plurality of nonlinear-access recording mediums such that data of neighboring image pixels are recorded on different recording mediums comprises: a first step of operating in the assigned time slot to release the data reproduced from the recording mediums to the outside, with the first step including a function quit detection step of receiving a detection signal indicative of whether or not data is released from the nonlinear-access recording mediums and responding to the detection signal, which indicates that the data is not released, to release specific error detection data in substitution for the data from the recording mediums and an error correction processing step of implementing the error correction process for the error detection data produced in the function quit detection step based on an interpolation process using reproduced data of the neighboring pixels.

A data reproduction method according to the sixth aspect of this invention for reproducing data including video data which is recorded on a plurality of nonlinear-access recording mediums such that data of neighboring image pixels are recorded on different recording mediums comprises: a first step of reproducing the recorded data; and a second step of operating in the assigned time slot to release the data reproduced from the recording mediums to the outside, with the first step including an error detection step of receiving and responding to the error detection signal, which indicates that data cannot be read out of the nonlinear-access recording mediums, to release error detection data in substitution for the data from the recording mediums, and with the second step including an error correction processing step of implementing the error correction process for the error detection data produced in the first step based on an interpolation process using data of the neighboring pixels released in the first step.

A data reproduction method according to the seventh aspect of this invention for reproducing data including video data which is recorded on a plurality of nonlinear-access recording mediums such that data of neighboring image pixels are recorded on different recording mediums, with at least one of the nonlinear-access recording mediums being assigned to record parity data of data which is recorded on the other recording mediums, comprises: a first step of reproducing the recorded data; and a second step of operating in the assigned time slot to release the data released in the first step to the outside, with the first step including a parity calculation step of receiving the data read out of the recording mediums and responding to the occurrence of readout error of the data to implement the parity calculation for the data read out of the other recording mediums by using the parity data and detect the error of the parity data and a parity error detection step of receiving the readout data and receiving and responding to the parity error detection signal produced in the parity calculation step to release specific error detection data in substitution for all of the readout data, and with the second step including an error correction processing step of implementing the error correction process for the error detection data produced in the first step by using data of the neighboring pixels reproduced in the first step.

A data recording and/or reproducing method according to an eighth aspect of this invention for recording data including video data onto a plurality of nonlinear-access recording mediums and reproducing the recorded data is the combination of the data recording method of the first aspect and the data reproduction method of the third aspect.

A data recording and/or reproducing method according to a ninth aspect of this invention for recording data including video data onto a plurality of nonlinear-access recording mediums and reproducing the recorded data is the combination of the data recording method of the first aspect and the data reproduction method of the fifth aspect.

A data recording and/or reproducing method according to a tenth aspect of this invention for recording data including video data onto a plurality of nonlinear-access recording mediums and reproducing the recorded data is the combination of the data recording method of the first aspect and the data reproduction method of the sixth aspect.

A data recording and/or reproducing method according to a eleventh aspect of this invention for recording data including video data onto a plurality of nonlinear-access recording mediums and reproducing the recorded data is the combination of the data recording method of the first aspect and the data reproduction method of the seventh aspect.

A data recording and/or reproducing method according to a twelfth aspect of this invention for recording data including video data onto a plurality of nonlinear-access recording mediums and reproducing the recorded data is the combination of the data recording method of the second aspect and the data reproduction method of the fourth aspect.

BRIEF DESCRIPTION OF THE DRAWINGS

FIGS. 2A and 2B are block diagrams of the data input and/or output processor;

FIGS. 5A through 5D are diagrams used to explain the reproduction operation of the case when one RAID fails to read out a video signal; and FIGS. 6A through 6D are diagrams used to explain the reproduction operation of the case when one RAID fails to read out video signals from multiple HDDs.

DESCRIPTION OF THE PREFERRED EMBODIMENTS

Figure 1:
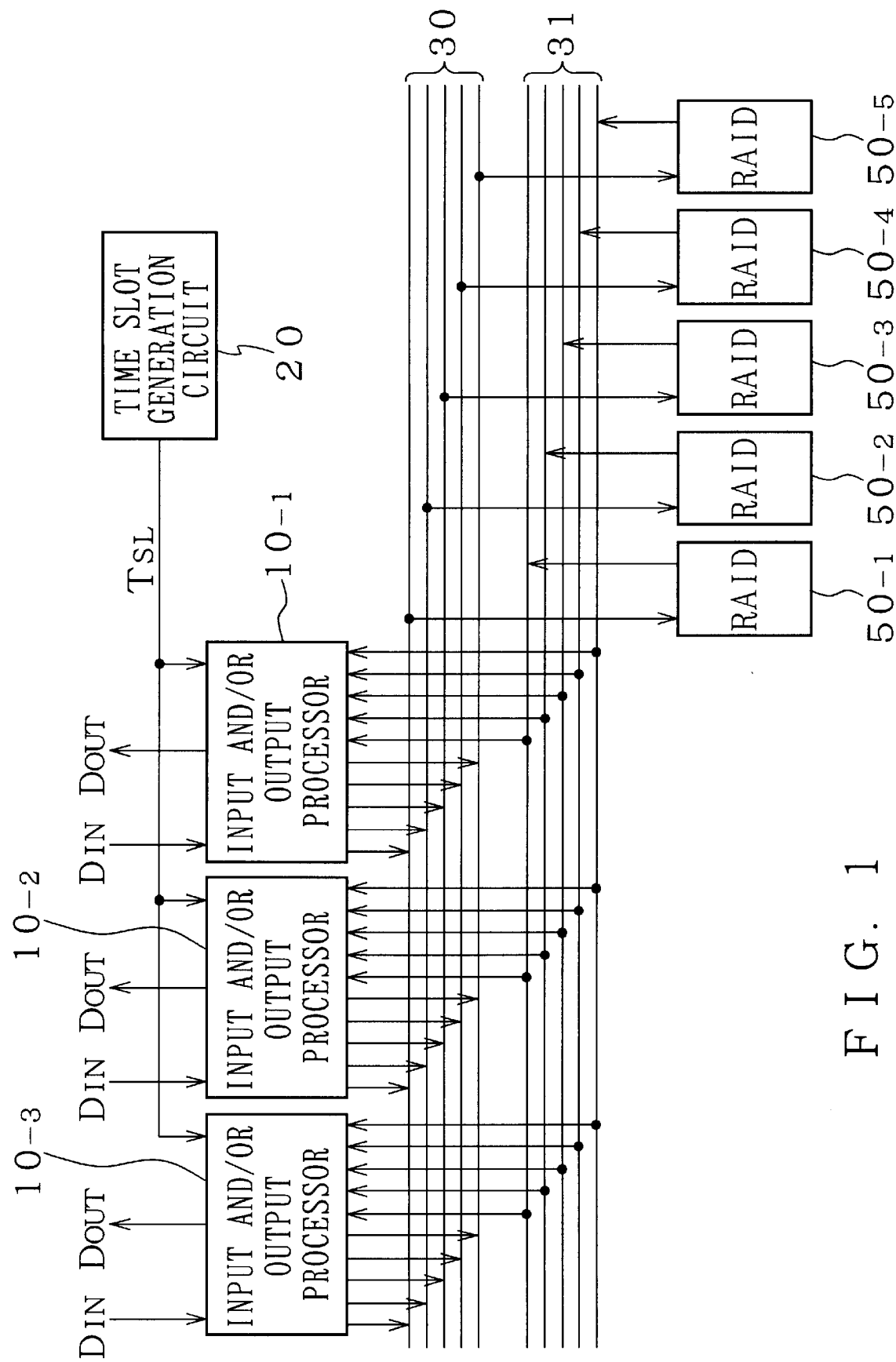
FIG. 1 is a block diagram showing the arrangement of the video signal recording and/or reproducing apparatus based on this invention.

An embodiment of this invention will be explained in detail with reference to the drawings. FIG. 1 shows the overall arrangement of the data recording and/or reproducing apparatus. The data recording and/or reproducing apparatus of this embodiment has three input and/or output processors 10-1, 10-2 and 10-3 which are controlled in accordance with the time slot signals TSL produced by a time slot generation circuit 20.

The time slot generation circuit 20 establishes time slots by dividing a predetermined cycle time (e.g., 1 second). The number of time slots is determined from the number of input and/or output processors. In the example shown in FIG. 1 including three input and/or output processors 10-1, 10-2 and 10-3, one cycle time is divided into three time slots, and the time slot signals TSL indicative of these time slots are given to the input and/or output processors 10-1, 10-2 and 10-3.

The input and/or output processors 10-1, 10-2 and 10-3 implement the data input and/or output processes in their assigned time slots, so that the data recording and/or reproducing apparatus apparently performs the simultaneous data input and/or output. That is, the data recording and/or reproducing apparatus of this embodiment performs the 3-channel simultaneous data input and/or output processes based on the three input and/or output processors 10-1, 10-2 and 10-3.

The input and/or output processors 10-1, 10-2 and 10-3 have each a recording processor made up of an input circuit 211, a serial-to-parallel conversion circuit 212, memories 213-1 through 213-5, and bus output processing circuits 214-1 through 214-5, as shown in FIG. 2A.

Input data Din, which is assumed to be video data in this embodiment, received by the input and/or output processor 10-1, 10-2 or 10-3 is entered to the input circuit 211.

The input circuit 211 slices the effective range of the input data Din, i.e., effective pixel range of the input video data.

The video data Dw released by the input circuit 211 is fed to the serial-to-parallel conversion circuit 212, which converts the serial video data Dw into parallel data Dwp. For the apparatus having five RAIDs as shown in FIG. 1, five parallel data $D_{WP}$-1 through $D_{WP}$-5 are produced by the serial-to-parallel conversion circuit 212 as shown in FIG. 2A. These parallel data $D_{WP}$-1 through $D_{WP}$-5 are stored distributively in the respective memories 213-1 through 213-5. Specifically, video data of five contiguous pixels are stored sequentially in the memories 213-1 through 213-5 which correspond to the five RAIDs of FIG. 1.

The parallel data $D_{WP}$-1 through $D_{WP}$-5 of five contiguous pixels are read out of the memories 213-1 through 213-5 of one input and/or output processor when the assess right to the RAID in terms of the time slot is in its turn. The readout data $D_{WQ}$-1 through $D_{WQ}$-5 are fed to the bus output processing circuits 214-1 through 214-5.

The bus output processing circuit 214-1 appends to the video signal $D_{WQ}$-1 read out of the memory 213-1 the command $C_{MW}$ for writing the video signal onto a HDD of the RAID 50-1 of FIG. 1, and releases the resulting video signal to the RAID 50-1 over the bus 30. The remaining bus output processing circuits 214-2 through 214-5 operate in the same manner as the circuit 214-1 to release the video signals $D_{WQ}$-2 through $D_{WQ}$-5, with the command $C_{MW}$ being appended thereto, to the RAID 50-2 through 50-5 over the bus 30.

Figure 3:
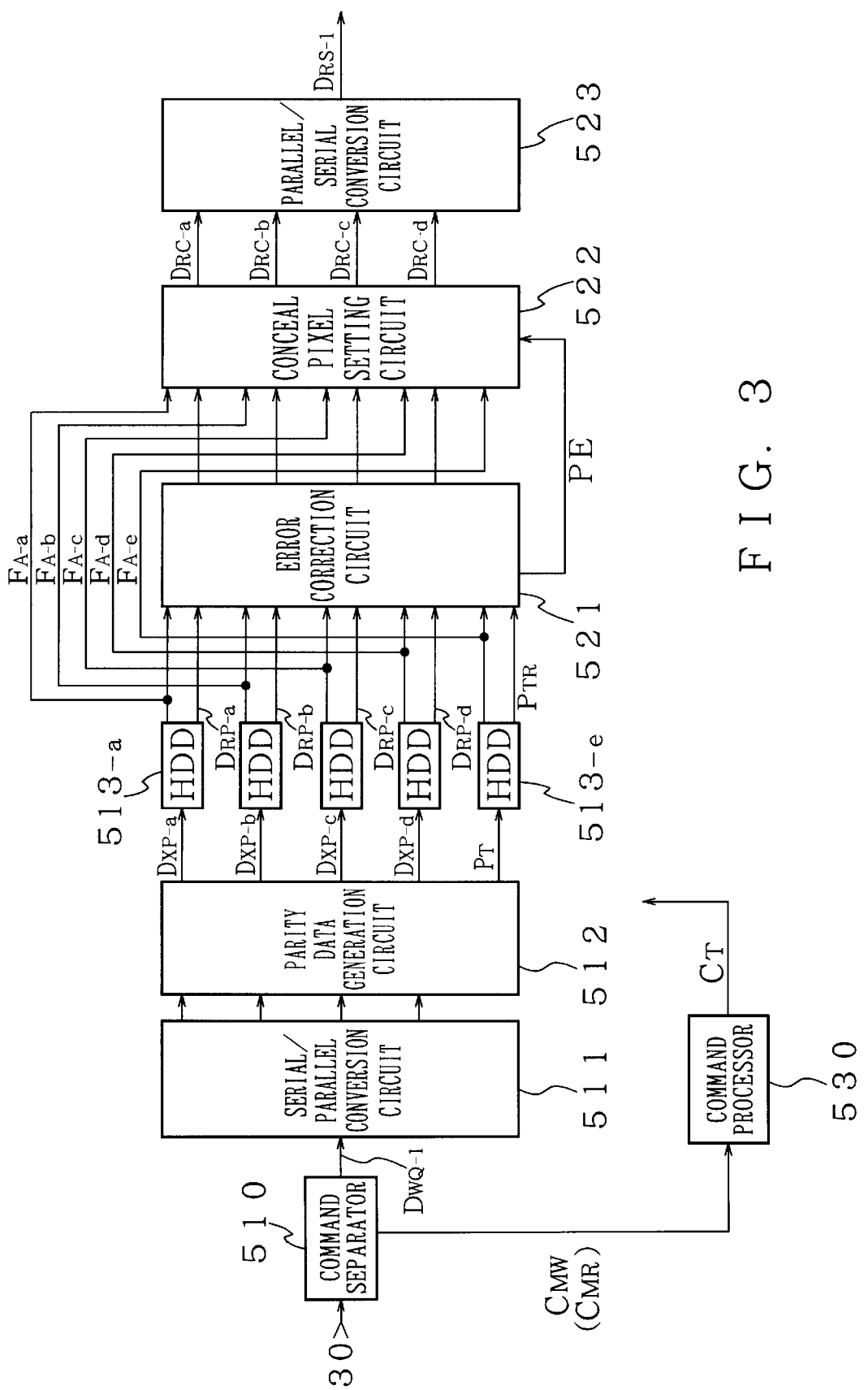
FIG. 3 is a block diagram of the RAID.

FIG. 3 shows the arrangement of the RAID 50-1 which is identical to the remaining RAIDs 50-2 through 50-5. The video signal $D_{WQ}$-1, with the command $C_{MW}$ being appended thereto, released by the bus output processing circuit 214-1 is received by the command separator 510 of the RAID 50-1.

The command separator 510 separates the video signal $D_{WQ}$-1 and command $C_{MW}$, and supplies the signal $D_{WQ}$-1 and command $C_{MW}$ to the serial-to-parallel conversion circuit 511 and command processor 530, respectively. The command processor 530 is also supplied with the command $C_{MR}$ for reading out the recorded video signal.

The command processor 530 produces a control signal CT from the command $C_{MW}$ and $C_{MR}$, and gives it to the serial-to-parallel conversion circuit 511 and HDDs 513-a through 513-e for the video signal recording and reproducing operations.

The serial-to-parallel conversion circuit 511 converts the signal $D_{WQ}$-1 into parallel video signals $D_{XP}$-a through $D_{XP}$-d, which are recorded by way of the parity data generation circuit 512 onto four recording HDDs 513-a through 513-d distributively. The parity data generation circuit 512 generates even-numbered or odd-numbered parity data PT for the video signals $D_{XP}$-a through $D_{XP}$-d to be recorded onto the HDDs 513-a through 513-d, respectively. The parity data PT is recorded onto the parity recording HDD 513-e.

At the reproduction of video signals on the HDDs 513-a through 513-d, the command processor 530 produces a control signal CT in accordance with the command $C_{MR}$ provided by the bus output processing circuit 214-1 through the bus 30. The control signal CT is given to the HDDs 513-a through 513-e, and the video signals $D_{RP}$-a through $D_{RP}$-d are read out of the HDDs 513-a through 513-d and the parity data $P_{TR}$ for the readout video signals $D_{RP}$-a through $D_{RP}$-d is read out of the HDD 513-e. The readout video signals $D_{RP}$-a through $D_{RP}$-d and parity data $P_{TR}$ are fed to the error correction circuit 521.

The HDDs 513-a through 513-e release detection signals FA-a through FA-e indicating as to whether the video signals and parity data are read out normally, and these signals are given to the error correction circuit 521 and conceal pixel setting circuit 522.

The error correction circuit 521 responds to the failure of reading of the video signal out of any one HDD based on the detection signals FA-a through FA-e to correct the video signal of readout failure by using the parity data $P_{TR}$, and the video signals read out of the HDDs 513-a through 513-d and the video signal corrected by the error correction process are fed to the conceal pixel setting circuit 522.

In response to the readout failure of video signals from multiple HDDs, in which case the video signals cannot be corrected by use of the parity data $P_{TR}$ and therefore the error correction process does not take place, only the video signals read out of the HDDs 513-a through 513-d are fed to the conceal pixel setting circuit 522. In case the parity is determined to be incorrect despite the successful readout of the video signals from the HDDs 513-a through 513-d, the error correction circuit 521 issues the parity error detection signal PE to the conceal pixel setting circuit 522.

In case the detection signals FA-a through FA-e indicate that video signals cannot be read out from multiple HDDs, the conceal pixel setting circuit 522 substitutes a predetermined signal for the readout signals. The substitutive video signal is "00" in hexadecimal, for example, that is inhibited for the D-1 and D-2 signals in the digital video data standard. Accordingly, the failure of video signal readout can readily be detected based on the detection of this inhibit code.

The conceal pixel setting circuit 522, when it has received the parity error detection signal PE, i.e., when video signals have been read out of all HDDs with the determination of incorrect parity, cannot discriminate as to which video signal is faulty, and therefore it substitutes the predetermined signal for all video signals read out of the HDDs 513-a through 513-d. The video signals $D_{RC}$-a through $D_{RC}$-d resulting from the process of the conceal pixel setting circuit 522 are fed to the parallel-to-serial conversion circuit 523.

The parallel-to-serial conversion circuit 523 converts the parallel video signals $D_{RC}$-a through $D_{RC}$-d into a serial video signal $D_{RS}$-1, appends a sync signal to the video signal $D_{RS}$-1, and releases the resulting video signal to one input and/or output processor 10-1 over the bus 31.

The remaining RAIDs 50-2 through 50-5 operate in the same manner as the RAID 50-1 to record the video signals $D_{WQ}$-2 through $D_{WQ}$-5, and at the readout of video signals, to release the video signals $D_{RS}$-2 through $D_{RS}$-5, with the sync signal being appended thereto, to the input and/or output processor 10-1.

In the input and/or output processor 10-1, the video signal $D_{RS}$-1 provided by the RAID 50-1 over the bus 31 is fed to the bus input processing circuit 231-1. Similarly, the video signals $D_{RS}$-2 through $D_{RS}$-5 provided by the RAIDs 50-2 through 50-5 are fed to the bus input processing circuits 231-2 through 231-5.

The bus input processing circuit 231-1 detects the sync signal on the bus 31 and writes the received video signal $D_{RS}$-1 into the memory 233-1 by way of the function quit detection circuit 232 in response to the detected sync signal. The circuit 231-1 also produces from the detected sync signal a sync detection signal $S_D$-1 indicative of the release of the video signal $D_{RS}$-1, and gives it to the function quit detection circuit 232. The remaining bus input processing circuits 231-2 through 231-5 operate in the same manner as the circuit 231-1.

The function quit detection circuit 232 judges based on the received sync detection signals $S_D$-1 through $S_D$-5 as to whether the video signals are supplied from the RAIDs 50-1 through 50-5 over the bus 31. If the supply of a video signal is denied, the circuit 232 writes the predetermined signal mentioned previously in substitution for the video signal from the RAID into the memory.

The video signal written in the memory 233-1 is read out sequentially as video signal $D_{RM}$-1 and fed into the parallel-to-serial conversion circuit 234. Similarly, the video signals written in the memories 233-2 through 233-5 are read out as video signals $D_{RM}$-2 through $D_{RM}$-5 and fed into the parallel-to-serial conversion circuit 234.

The parallel-to-serial conversion circuit 234 converts the parallel video signals $D_{RM}$-1 through $D_{RM}$-5 from the memories 233-1 through 233-5 into a serial video signal $D_{MS}$, and releases it to the conceal processing circuit 235.

The conceal processing circuit 235 verifies the signal level of the video signal $D_{MS}$ thereby to detect that no video signal is read out of a HDD or no video signal is provided by a RAID, in which cases the circuit 235 mends the video signal $D_{MS}$ based on the interpolation process using video signals of the neighboring pixels. The mended video signal $D_{MS}$ is fed as video signal $D_{CR}$ to the output circuit 236, by which the signal $D_{CR}$ is formatted properly and released as video output signal $D_{OUT}$.

The remaining input and/or output processors 10-2 and 10-3 have the same arrangement as the processor 10-1. These input and/or output processors 10-1 through 10-3 operate to write the input data into the RAIDs 50-1 through 50-5 in the assigned time slots and also release data which have been read out of the RAIDs 50-1 through 50-5 in the assigned time slots.

Figures 4A, 4B, 4C, 4D:
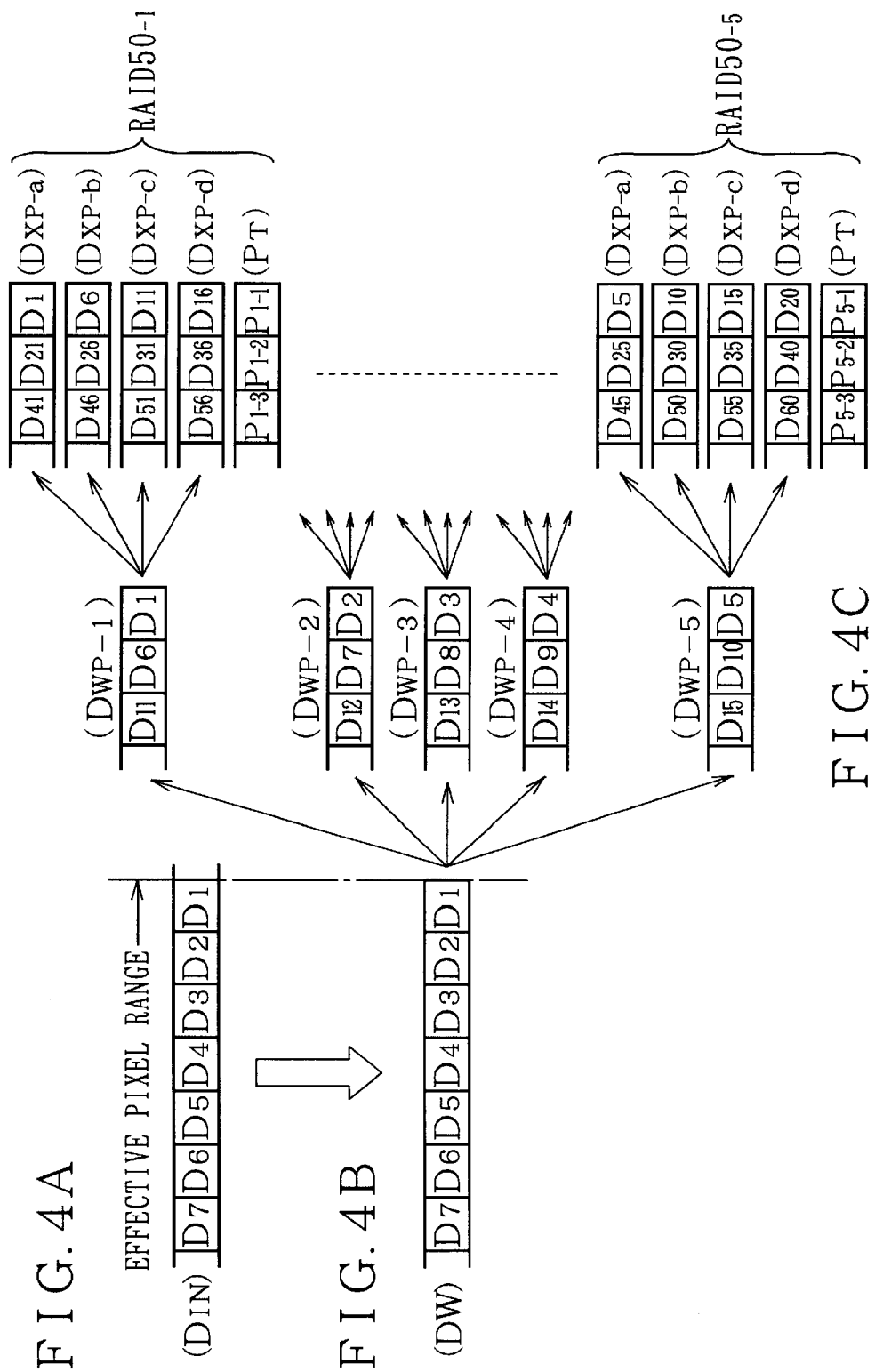
FIGS. 4A–4D are diagrams used to explain the recording operation for the input video signal.

Next, the operation of the data recording and/or reproducing apparatus will be explained with reference to FIGS. 4A–4D, FIGS. 5A–5D, and FIGS. 6A–6D. FIGS. 4A–4D are diagrams showing the video signal recording process, of which FIG. 4A shows the digital input video signal $D_{IN}$ received by the video signal recording and/or reproducing apparatus.

The input video signal $D_{IN}$ is fed to the input circuit 211 of the input and/or output processor, and the circuit 211 extracts a video signal $D_W$ of the effective pixel range as shown in FIG. 4B from the input video signal $D_{IN}$. Specifically, D1 is the 1st pixel data in the effective pixel range, D2 is the 2nd pixel data, D3 is the 3rd pixel data, and so on. This naming of pixel data is equally applied to the following FIGS. 5A through 5D and FIGS. 6A through 6D.

The video signal $D_W$ is converted by the serial-to-parallel conversion circuit 212 into video signals $D_{WP}$-1 through $D_{WP}$-5, in which individual pixel data $D_1$, $D_2$, $D_3$, and so on are distributed sequentially and cyclically as shown in FIG. 4C, and written into the corresponding memories. The video signals $D_{WP}$-1 through $D_{WP}$-5 are read out of the memories and fed to the RAIDs 50-1 through 50-5 in the assigned time slots.

On the RAIDs 50-1 through 50-5, the video signals are converted into parallel video signals as shown in FIG. 4D by the individual serial-to-parallel conversion circuits 511 and stored on the HDDs 513-a through 513-d. The video signals stored on the HDDs 513-a through 513-d have their corresponding parity data stored on the HDD 513-e. Due to the dual serial-to-parallel conversions, video signals of discontinuous pixels are recorded onto one HDD and also into the RAID.

At the reproduction of the video signals which have been recorded as explained above, if, for example, the RAIDs 50-1, 50-3 and 50-5 could read out video signals $D_{RP}$-a through $D_{RP}$-d from the HDDs, but the RAID 50-4 could not read out the video signal, as shown in FIG. 5A, i.e., if the function quit detection circuit has detected that the data bus sync detect signal SD-4 from the RAID 50-4 has not become active, a specific error detection value, e.g., "00" in hexadecimal, is written into the memory 233-4. Accordingly, the video signals $D_{RM}$-1 through $D_{RM}$-3 and $D_{RM}$-5 read out of the memories 233-1 through 233-3 and 233-5 have correct data values, while the video signal $D_{RM}$-4 read out of the memory 233-4 has a data value of "00" as shown in FIG. 5B.

The parallel-to-serial conversion circuit 234, which has received the video signals $D_{RM}$-1 through $D_{RM}$-5, produces a serial video signal $D_{MS}$ as shown in FIG. 5C. The video signal $D_{MS}$ is fed to the conceal processing circuit 235, and if the circuit detects the inhibit code "00" in pixel data, it mends the video signal of that pixel based on the interpolation process using video signals of the neighboring pixels. For example, if the mended video signal $D_{CR}$ derived from the video signal $D_{MS}$ is deficient for its fourth pixel data $D_4$ and it is substituted by "00" as shown in FIG. 5C, the interpolation process by use of the 3rd pixel data $D_3$ and 5th pixel data $D_5$ takes place to produce $D_4'$ for the 4th pixel data as shown in FIG. 5D.

In this manner, even if a video signal cannot be read out from one RAID, it is produced from video signals of other RAIDs by the interpolation process, and following the formatting process for the resulting video signal $D_{CR}$ to produce the output video signal $D_{OUT}$ by the output circuit 236, a high-fidelity picture can be reproduced continuously.

Next, the readout failure of video signals from multiple HDDs of one RAID will be explained with reference to FIGS. 6A–6D. If, for example, the RAID 50-2 has failed to read out the video signals $D_{RP}$-b and $D_{RP}$-C from its two HDDs 513-b and 513-c in FIG. 6A, i.e., if the conceal pixel setting circuit 522 has detected based on the detection signals $F_A$-b and $F_A$-c provided by the HDD-b and HDD-c that the video signals could not be read out of the HDDs 513-b and 513-c, the video signals of readout failure are substituted by a specific error detection value, e.g., "00" in hexadecimal. Accordingly, the video signals $D_{RM}$-1, $D_{RM}$-2, $D_{RM}$-4 and $D_{RM}$-5 read out of the memories 233-1, 233-2, 233-4 and 233-5 have correct data values, while the video signal $D_{RM}$-3 read out of the memory 233-3 has a data value of "00", as shown in FIG. 6B.

The parallel-to-serial conversion circuit 234, which receives the video signals $D_{RM}$-1 through $D_{RM}$-5, produces a video signal $D_{MS}$ as shown in FIG. 6C. The video signal $D_{MS}$ is fed to the conceal processing circuit 235, and if the circuit detects the inhibit code "00" in pixel data, it mends the video signal of that pixel based on the interpolation process using video signals of the neighboring pixels. Specifically, in this example, video signals cannot be read out of the HDDs 513-b and 513-c, and therefore the mended video signal $D_{CR}$ derived from the video signal $D_{MS}$ is deficient for its eighth pixel data $D_8$ and it is substituted by "00" as shown in FIG. 6C. The interpolation process by use of the 7th pixel data $D_7$ and 9th pixel data $D_9$ takes place to produce $D_8'$ for the 8th pixel data as shown in FIG. 6D. The video signal is further deficient for its 13th pixel data $D_{13}$ and it is substituted by "00". The interpolation process by use of the 12th pixel data $D_{12}$ and 14th pixel data $D_{14}$ (not shown) takes place to produce $D_{13}'$ for the 13th pixel data.

In this manner, even if video signals cannot be read out from multiple HDDs of one RAID, they are produced from video signals of other RAIDs by the interpolation process, and following the formatting process for the resulting video signal $D_{CR}$ to produce the output video signal $D_{OUT}$ by the output circuit 236, a high-fidelity picture can be reproduced continuously.

The next is the case where the parity data has been determined to be incorrect despite the confirmation of successful readout of video signals from the multiple HDDs 513-a through 513-e of a RAID based on the detection signals $F_A$-a through $F_A$-e provided by these HDDs, in which case as to whether any video signal is incorrect or parity data is incorrect cannot be discriminated. Therefore, the parity error detection signal PE is fed to the conceal pixel setting circuit 522 so that all video signals read out of that RAID are replaced with the signal of the predetermined value "00". That is, all video signals read out of the RAID having the parity error detection signal PE are altered to "00" (accordingly, $D_{RM}$-4 has all "00" data values) as shown in FIG. 5B. The signal of "00" is rendered the interpolation process by the conceal processing circuit 235, and consequently a high-fidelity picture can be reproduced.

In another case when failing HDDs of a RAID are replaced with new ones, with the predetermined data value "00" being recorded across the entire range, the "00" signals read out of the new HDDs will be re-evaluated automatically based on the interpolation process using the neighboring pixels having correct data values. Consequently, it is possible to reproduce a high-fidelity picture continuously without the need of recording the video signals onto the new HDDs.

According to the foregoing embodiment of this invention, even if a video signal recorded in any of multiple RAIDs cannot be read out, or video signals recorded on multiple HDDs of a RAID cannot be read out, a high-fidelity picture can be reproduced for editing or broadcasting.

It should be noted that the number of RAIDs and HDDs and the predetermined data value "00" in the foregoing embodiment are given for the illustrative purpose, but not for the confinement. For the interpolation process, data values of two pixels on each side of the object pixel may be used, instead of immediately neighboring two pixels. Although in the foregoing embodiment, video signals are recorded in RAIDs each including multiple HDDs, it is obviously possible to record video signals on optical disks, magneto-optical disks or semiconductor memories such as DRAMs.

According to the present invention, a digital video signal is recorded onto and read out from multiple nonlinear-access recording mediums, and in case a video signal of a pixel cannot be read out, the video signal of that pixel is produced based on the interpolation process using video signals of the neighboring pixels which have been read out correctly, whereby a high-fidelity picture can be reproduced continuously.

What is claimed is:

1. A data reproducing apparatus for reproducing video data recorded on a plurality of non-linear access recording mediums such that neighboring image pixels are recorded on different recording mediums, said apparatus comprising:

a plurality of RAIDs for reproducing said video data; each RAID having a plurality of said non-linear access recording mediums, an error correction circuit, and a conceal pixel setting circuit;

said error correction circuit correcting erroneous pixels in the reproduced video data using previously recorded parity data when said erroneous pixels are reproduced from a single nonlinear-access recording medium;

said conceal pixel setting circuit substituting a first predetermined signal for erroneous pixels in the reproduced video data when said erroneous pixels are reproduced from more than one nonlinear-access recording medium;

a plurality of output processors for output processing video data reproduced from said plurality of non-linear access recording mediums; each output processor having a function quit detection circuit and a conceal processing circuit;

said function quit detection circuit detecting when one of said RAIDs is not functioning and substituting a second predetermined signal for the reproduced video data from the non-functioning RAID; and said conceal processing circuit detecting said first and second predetermined signals and mending the reproduced video data by interpolating for the pixels substituted for by said first and second predetermined signals using neighboring pixels.

2. A method of reproducing video data recorded on a plurality of non-linear access recording mediums such that neighboring image pixels are recorded on different recording mediums, said method comprising the steps of:

reproducing said video data from a plurality of RAIDs; each RAID having a plurality of non-linear access recording mediums, an error correction circuit, and a conceal pixel setting circuit;

correcting erroneous pixels in the reproduced video data using previously recorded parity data when said erroneous pixels are reproduced from a single nonlinear-access recording medium;

substituting a first predetermined signal for erroneous pixels in the reproduced video data when said erroneous pixels are reproduced from more than one nonlinear-access recording medium;

output processing video data reproduced from said plurality of non-linear access recording mediums using a plurality of output processors; each output processor having a function quit detection circuit and a conceal processing circuit;

detecting when one of said RAIDs is not functioning and substituting a second predetermined signal for the reproduced video data from the non-functioning RAID; and detecting said first and second predetermined signals and mending the reproduced video data by interpolating for the pixels substituted for by said first and second predetermined signals using neighboring pixels.

3. The data reproducing apparatus according to claim 1, wherein at least one nonlinear-access recording medium of each RAID is assigned to record parity data generated by a parity data generation circuit from the processed input video data.

4. The data reproducing apparatus according to claim 1, wherein each said output processor operates during a respective time slot assigned by a time slot generation circuit.

5. The data reproducing method according to claim 2, wherein at least one nonlinear-access recording medium of each RAID is assigned to record parity data generated by a parity data generation circuit from the processed input video data.

6. The data reproducing method according to claim 2, wherein each said output processor operates during a respective time slot assigned by a time slot generation circuit.

* * * * *